June 24, 1952  A. M. HOWALD ET AL  2,601,525
BULLETPROOF FUEL TANK
Filed Feb. 3, 1949
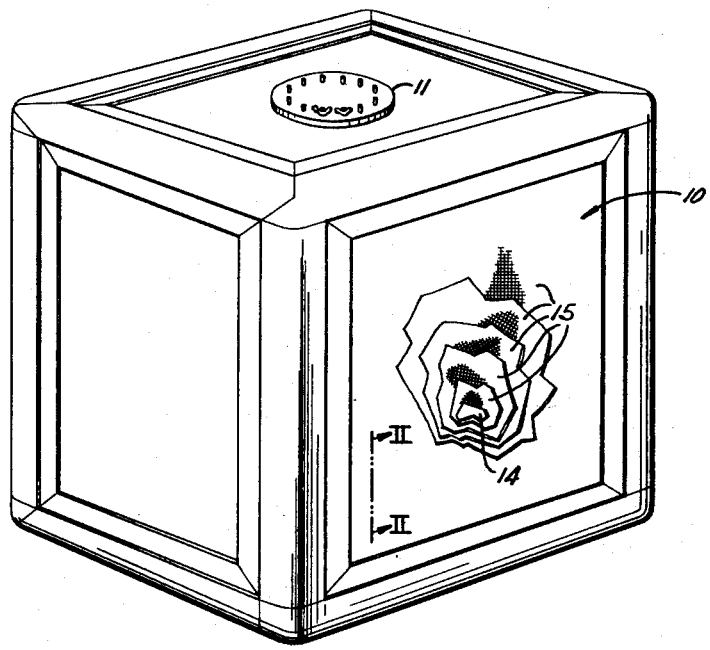
Fig. I
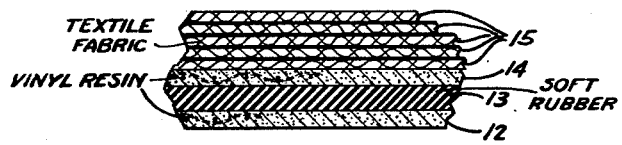
Fig. II
Arthur M. Howald
Leonard S. Meyer
INVENTORS
BY Marshall & Marshall
ATTORNEYS Patented June 24, 1952

2,601,525

UNITED STATES PATENT OFFICE 2,601,525

BULLETPROOF FUEL TANK

Arthur M. Howald, Perrysburg, and Leonard S. Meyer, Newark, Ohio, assignors to Libbey-Owens-Ford Glass Company, Toledo, Ohio, a corporation of Ohio Application February 3, 1949, Serial No. 74,286

10 Claims. (Cl. 154—43.5)

The invention relates to an improved bulletproof fuel tank of the self-sealing type, particularly for use in military aircraft.

The fuel tank is one of the most vulnerable parts of a military airplane. When a machine gun bullet of the armor-piercing type passes through a fuel tank, it produces such a large hole that the gasoline or other liquid fuel is immediately lost from the tank unless the tank is self-sealing. Such loss of the fuel from the tank is likely to cause both failure of the fuel supply and fire.

In armored cars, steel armor plate several inches thick may be used to ward off armor-piercing machine gun bullets, but of course it is not feasible to construct a fuel tank for military aircraft of such armor plate because of its great weight.

A fuel tank for military aircraft must be constructed of relatively light-gauge material, which is easily penetrated by an armor-piercing machine gun bullet. Therefore, it must be assumed that an armor-piercing bullet that strikes such a fuel tank will pass completely through the tank, and the tank must be provided with a self-sealing liner that will close the holes made by the bullet and prevent the loss of the fuel.

Various self-sealing liners for fuel tanks are known. Such a liner consists ordinarily of an inner layer and an outer layer that are impervious to the fuel, supporting a central layer of material that is swollen upon contact with the fuel. When a liner so constructed is punctured by a bullet, the fuel escapes through the hole in the inner layer, and comes in contact with the swellable central layer. The resultant swelling of the central layer at the point where it is punctured causes the hole to be sealed before any great quantity of fuel has been lost, provided the hole is not too large.

An armor-piercing machine gun bullet is fired with a heavy charge of powder, and travels at an extremely high velocity. The impact of such a bullet entering a fuel tank creates a tremendous pressure in the tank, and the bullet, which is ordinarily tumbling as it passes through the tank, drives a column of the liquid through the tank under great pressure. The self-sealing liner must therefore be supported by walls capable of withstanding the pressure created in the tank by the impact of the bullet. If these walls disintegrate when a bullet passes through the tank, the self-sealing liner disintegrates with them.

Since the liner is only effective for sealing a reasonably small hole left by a bullet, the supporting walls of the tank must not only be such that they do not disintegrate when struck by a bullet, but must also be such that the bullet does not leave too large a hole upon passing through them.

Many materials that are not ordinarily considered brittle will act as though extremely brittle when struck with a sufficiently sharp impact. Thus sheet steel cannot be used for the supporting walls of the tank, because a tank of sheet steel virtually exploded when struck by an armor-piercing bullet. A hard material such as steel cannot be used for the supporting walls, because it shatters when struck by the bullet, instead of failing merely at the point where the bullet strikes. There are many other materials that are useless because they shatter when struck by a high-velocity bullet. A tank wall made of plywood, for example, splinters into small fragments when an armor-piercing bullet passes through it.

The least objectionable materials heretofore known for use as the supporting walls of such tanks are soft metals, such as aluminum. A soft metal wall does not disintegrate as a bullet passes through the tank, but such a wall is not satisfactory because it is badly torn at the point where the bullet emerges, by the impact of the bullet and the column of liquid that the bullet drives through the tank. In such tearing, portions of the soft metal tend to open outward like the petals of a flower. The tearing and outward flaring of the portions of the metal surrounding the hole leave such a large opening that the liner bulges outward over a large area. The outward bulging of the liner over the area where it is unsupported then prevents the liner from sealing satisfactorily.

Moreover, supporting walls of soft metal take a permanent bulge under the pressure set up in the tank by the impact of a bullet. Such bulging of the walls tends to pull out the rivets and open the seams, so that one of the sides of the tank is likely to fly off after a few bullets have passed through the tank.

The principal object of the invention is to provide a bullet-proof gasoline tank having walls which do not shatter or become bulged as an armor-piercing bullet passes through the tank, and which fail in such a manner under the impact of a bullet that a relatively small hole is left at each point where a bullet passes through. More specific objects and advantages are apparent from the description, in which reference is had to the accompanying drawing illustrating a preferred form of tank embodying the invention.

Fig. I of the drawing is a perspective view of the preferred form of tank with portions broken away.

Fig. II is a fragmentary section taken on the line II—II of Fig. I.

This specific drawing and the specific description that follows merely disclose and illustrate the invention, and are not intended to impose limitations upon the claims.

The invention is based upon the discovery that a supporting wall made by cementing together a plurality of superimposed layers of a textile fabric fails in a highly desirable manner under the impact of a high-velocity bullet. A fuel tank whose walls are so constructed does not become bulged when an armor-piercing bullet passes through it. The superimposed and cemented layers of the textile fabric have a peculiar type of strength and resistance to permanent deformation, which prevents the tank from being bulged more than instantaneously by the high internal pressure caused by the impact of the bullet. Yet, as the bullet passes through the wall, it leaves a relatively small hole, and the hole that is left is filled with a fibrous mass of ravelings that tends to support the inner liner. A wall so constructed shows no tendency to shatter under the impact of the bullet, and yet does not tear or flare outward around the point where the bullet leaves the tank.

A fuel tank embodying the invention is provided with a self-sealing liner. Various self-sealing liners for fuel tanks are known, and any desired type of self-sealing liner may be employed in carrying out the invention.

Canvas, duck, burlap, linen, natural or artificial silk, woolen cloth, or any other desired textile fabric may be used for building up the supporting wall. The superimposed layers of fabric in the supporting wall are cemented together by an adhesive. The adhesive employed may be any substance that will stick the superimposed layers of fabric together, such as a urea-formaldehyde resin adhesive, a phenol-formaldehyde resin adhesive, a vinyl resin adhesive, a casein glue, an animal glue, or a vegetable glue. The amount of adhesive employed should only be sufficient to cement the superimposed layers of fabric together, and should not be sufficient to produce substantial impregnation of the fabric. Preferably the adhesive is one that is insoluble in the gasoline or other fuel to be carried in the tank, so that small quantities of the fuel leaking out of the tank will not tend to soften up the supporting walls of the tank. The supporting walls of a tank embodying the invention may be built up in any desired manner. However, it is preferable to form the walls in a monolithic manner so that no joints are present, and so that no bolts or screws are required to secure the walls together.

One of the important advantages of the present invention is that it can be used to produce the supporting walls of the tank in monolithic form and in any desired shape or curvature. The curved form that may be used for the walls enhances their strength. The absence of any joints or seams in a monolithic tank embodying the invention is advantageous because joints and seams are the weakest portions of a tank, which tend to open up and fail under the repeated impact of bullets.

In producing the walls in a monolithic structure, it is necessary to build the structure from the successive layers of textile fabric on a supporting form, which may be built of wood, wire, plaster or any other suitable material. If the self-sealing liner is sufficiently rigid, the liner itself may serve as the form on which the supporting walls are built. If desired, the tank may be constructed complete except for the liner. After the interior of the resulting structure has been coated with a suitable cement, a liner of flexible material may then be passed in through the mouth of the tank, and stretched out into place against the interior of the tank.

In the preferred method of constructing the tank, the self-sealing liner is first placed over a form of suitable shape. A layer of textile fabric is then applied over a thin layer of adhesive on the the liner. Successive layers of fabric are then applied, with a layer of adhesive between the adjacent layers of fabric to cement them together. Each layer of fabric may be applied in one or more pieces, and the pieces may be cut out so that they will fit smoothly around the underlying layer. The pieces from each layer should overlap the pieces in the underlying layer, so that the joints between the pieces will come at different points in each layer, for maximum strength. It is also desirable to cut the successive layers of fabric on the bias at varying angles so that the threads in the various layers will extend at various angles. If the precautions of staggering the joints in the various layers and applying the layers with the threads running at various angles are observed, a minimum number of layers may be employed to give maximum strength. If the adhesive contains a solvent, drying may be allowed to take place after the application of each layer and before the succeeding layer is applied. In this method of construction, the form should be of such a character that it can easily be dismantled and removed through the mouth of the finished tank.

The tank shown in the drawings consists of supporting walls 10, made of superimposed layers of a textile fabric cemented together, and a cover 11 bolted on the mouth of the tank. The cover 11 may be made in the same manner as the walls of the tank, by cementing together successive layers of a textile fabric. A portion of the tank in Fig. I is broken away to show how the threads in the successive layers of the textile fabric run in various directions. Additional reinforcing strips may be cemented along the corners of the tank, as shown in the drawing.

The inner layers 12, 13 and 14 in Fig. II constitute the self-sealing liner. The two outermost layers 12 and 14 of the liner may consist of a flexible vinyl resin that is impervious to gasoline. The intermediate layer 13 is made of soft rubber, which swells wherever the gasoline reaches it. One or more of the layers that make up the self-sealing liner, such as the layers 12 and 14 shown in the drawing, may have embedded therein a loosely woven reinforcing fabric. The innermost layer 15 of the textile fabric may be cemented to the liner by means of a vinyl adhesive, which sticks both to the textile fabric and to the immediately underlying layer of vinyl plastic. Any adhesive that sticks to the textile fabric may be used between the layers of fabric 15.

Among the hardenable synthetic resin adhesives, urea-formaldehyde adhesives have the advantage that they can be hardened by the action of a hardening agent at ordinary temperatures. Phenolic resin adhesives require elevated temperatures for hardening, so that a tank constructed with the use of a phenolic resin adhesive would have to be baked in an oven in order to harden the phenolic adhesive between the layers of the textile fabric. A urea-formaldehyde adhesive may not be satisfactory for use with certain fabrics to which it does not stick very well. For example, a cellulose acetate dope may give better results with acetate rayon.

A urea-formaldehyde adhesive may be prepared as follows: 1 mol of urea is added to a 37 per cent aqueous solution containing 2 mols of formaldehyde, which has been brought to a pH between 5 and 6 by means of sodium hydroxide. The resulting solution is gently refluxed (about 1 hour) to carry the reaction to a suitable stage. For the purpose of storage or shipment, a solution so produced may be neutralized and evaporated by spray-drying or vacuum drum-drying to produce a solid product. The adhesive is preferably kept in a neutral condition until it is ready to be used, in order to avoid deterioration. A urea-formaldehyde adhesive so prepared is used in aqueous solution, and a hardening agent is dissolved in the solution of the adhesive before it is applied. Hardening agents that can be used are acids, acid salts, and various substances that liberate acids. The amount of hardening agent may be varied in accordance with the speed of hardening desired.

*Example*

A hollow form of the desired shape is prepared by casting it in sections from plaster of Paris. After the sections have been assembled, the exterior of the form should have the shape that is desired for the walls of the tank. The form is first covered with a seal-sealing liner, which may be of the type shown in the drawing. A layer of a woven textile fabric, such as No. 3 (26 oz.) cotton canvas duck, is then cemented over the self-sealing liner by means of a suitable adhesive. 100 parts of a spray-dried urea-formaldehyde condensation product, prepared in the manner described above, are then dissolved in 50 parts of water, together with 2 parts of ammonium chloride, or an equivalent amount of an ammonium salt of another strong acid, as a hardening agent. The resulting adhesive solution has the proper viscosity so that when it is applied to the canvas by brushing, very little impregnation of the canvas takes place. The layer of canvas that has been applied over the liner is coated with this adhesive solution, and a coating of the adhesive is simultaneously applied to a second layer of canvas. After a few seconds, when the adhesive coatings have dried sufficiently to become quite tacky, the second layer of canvas is applied upon the first layer, and is smoothed out and pressed down by hand. Any air bubbles that occur beneath the second layer of canvas are worked out at the nearest edge of the sheet. Successive layers of canvas are cemented in place in the same manner until 5 to 10 layers have been applied. The number of layers should be sufficient to give the desired strength. The completed tank is then allowed to harden at room temperature until the expiration of a few hours from the time when the hardening agent was incorporated in the adhesive solution. The hardening of the adhesive is then complete, and the form may be broken down and removed through the mouth of the tank. The tank may be allowed to dry out further at atmospheric temperature, or it may be placed in an oven at about 150° F., to hasten the drying. The best results are obtained if the weight of the supporting walls, exclusive of the weight of the liner, is about 30 per cent greater than the weight of fabric used, so that the supporting walls contain approximately 25 per cent of urea-formaldehyde resin and 75 per cent of fabric. The proportion of resin in the walls may vary from about 15 to about 50 per cent. If the proportion of resin is less than about 15 per cent, the layers of fabric may not be satisfactorily bonded together, and if the proportion of resin is greater than about 50 per cent, the walls may tend to be brittle. A tank constructed in accordance with this example, about 2 feet square and 2 feet high, filled with gasoline, was hit by 4 armor-piercing 50-caliber machine gun bullets, and then by two bursts of 3 such bullets each, without causing any material loss of gasoline from the tank, without causing any more than temporary leakage, and without causing any bulging or other permanent deformation of the tank. When the ordinary type of aircraft fuel tank, having an identical self-sealing liner surrounded by supporting walls of aluminum, is subjected to such a test, it almost invariably suffers complete structural failure, with loss of its contents.

This is a continuation-in-part of our abandoned application Serial No. 761,336, which was filed July 16, 1947, and which was a continuation-in-part of our abandoned application Serial No. 401,944, filed July 11, 1941.

Various embodiments of the invention may be devised to meet various requirements.

Having described the invention, we claim:

1. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member substantially coextensive in area with said lining and said sealing layer comprising a plurality of layers of fibrous material interspersed between and adhered to layers of hard resinous material, said supporting member having sufficient stiffness to prevent substantial sagging and distortion of said tank when filled with fuel and being substantially free of any tendency to foliate upon penetration by a projectile; said lining, sealing layer, and supporting member all being adhered together.

2. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of layers of filamentary yarns interspersed between and adhered to layers of hard resinous material, said supporting member having sufficient stiffness to prevent substantial sagging and distortion of said tank when filled with fuel and being substantially free of any tendency to foliate upon penetration by a projectile.

3. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of layers of filamentary yarns interspersed between and adhered to layers of hard resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together.

4. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of layers of cotton fabric interspersed between and adhered to layers of thermoset hard resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together.

5. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer consisting of a plurality of cross-plied layers of cotton fabric interspersed between and adhered to layers of thermoset hard resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together throughout their extent.

6. A self-sealing fuel tank adapted to seal punctures theirein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer consisting of a plurality of cross-plied layers of cotton fabric interspersed between and adhered to layers of thermoset urea-formaldehyde resin, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together throughout their extent.

7. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor comprising a plurality of layers of filamentary yarns interspersed between and firmly adhered to layers of hard resinous material, said yarns being only superficially impregnated with the resinous material, said supporting member having sufficient stiffness to prevent substantial sagging and distortion of said tank when filled with fuel and being substantially free of any tendency to foliate upon penetration by a projectile; said lining, sealing layer, and supporting member all being adhered together.

8. A self-sealing fuel tank adapted to seal punctures therein caused by projectiles, which comprises in combination a gasoline-resistant flexible lining, a rubbery sealing layer which swells rapidly but does not dissolve in gasoline and a non-metallic non-shattering stiff supporting member therefor substantially coextensive in area with said lining and sealing layer comprising a plurality of layers of filamentary yarns interspersed between and firmly adhered to layers of hard resinous material, said yarns being only superficially impregnated with the resinous material, said supporting member being outside said sealing layer and having sufficient stiffness to prevent substantial sagging and distortion of said tank when filled with fuel and being substantially free of any tendency to foliate upon penetration by a projectile; said lining, sealing layer and supporting member all being adhered together.

9. A self-sealing fuel tank adapted to seal punctures therein caused by projectiles which comprises in combination a gasoline-resistant flexible lining, a rubbery sealing layer which swells rapidly but does not dissolve in gasoline and a non-metallic non-shattering stiff supporting member therefor comprising a plurality of layers of textile fabric interspersed between and firmly adhered to layers of thermoset hard resinous material, said fabric being only superficially impregnated with the resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together.

10. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of cross-plied layers of cotton fabric interspersed between and firmly adhered to layers of thermoset hard resinous material, said fabric being only superficially impregnated with the resinous material, said supporting member having sufficient stiffness to prevent substantial sagging and distortion of said tank when filled with fuel and being substantially free of any tendency to foliate upon penetration by a projectile; said lining, sealing layer, and supporting member all being adhered together.

ARTHUR M. HOWALD.
LEONARD S. MEYER.

No references cited.